United States Patent [19]

Wu et al.

[11] Patent Number: 4,752,625
[45] Date of Patent: * Jun. 21, 1988

[54] THERMOPLASTIC FOAM MOLDING

[75] Inventors: Wen-Pao Wu, Victor; Charles M. Krutchen, Pittsford, both of N.Y.

[73] Assignee: Mobil Oil Corporation, New York, N.Y.

[*] Notice: The portion of the term of this patent subsequent to Aug. 13, 2002 has been disclaimed.

[21] Appl. No.: 754,305

[22] Filed: Jul. 12, 1985

Related U.S. Application Data

[62] Division of Ser. No. 560,642, Dec. 12, 1983, Pat. No. 4,532,094.

[51] Int. Cl.⁴ .................................................. C08J 9/00
[52] U.S. Cl. .................................... 521/139; 521/56; 521/60; 521/79; 521/81; 521/98; 521/180; 521/184; 521/185; 521/189; 521/918
[58] Field of Search ................... 521/98, 918, 189, 184, 521/185, 139, 180, 79, 81, 60, 56

[56] References Cited

U.S. PATENT DOCUMENTS

| | | | |
|---|---|---|---|
| 3,277,029 | 10/1966 | Chadwick | 521/180 |
| 3,290,261 | 12/1966 | Goldblum | 521/180 |
| 3,389,198 | 6/1968 | Taber | 264/54 |
| 3,738,963 | 6/1973 | Praetorius et al. | 521/180 |
| 3,903,224 | 9/1975 | Billiu | 521/180 |
| 3,962,154 | 6/1976 | Elgi | 521/79 |
| 4,065,401 | 12/1977 | Cohnen et al. | 521/180 |
| 4,097,425 | 6/1978 | Niznik | 521/139 |
| 4,263,409 | 4/1981 | Fiberti | 521/180 |
| 4,280,950 | 7/1981 | Nogata et al. | 521/180 |
| 4,315,076 | 2/1982 | Gagliani et al. | 521/189 |
| 4,334,030 | 6/1982 | Kochanowski | 521/139 |
| 4,360,486 | 11/1982 | DiBiasi et al. | 521/81 |
| 4,361,453 | 11/1982 | Gagliani et al. | 521/189 |
| 4,367,296 | 1/1983 | Gagliani et al. | 521/189 |
| 4,386,133 | 5/1983 | Blommers et al. | 521/60 |
| 4,665,105 | 5/1987 | Krutchen et al. | 521/180 |

Primary Examiner—Morton Foelak
Attorney, Agent, or Firm—A. J. McKillop; M. G. Gilman; J. P. O'Sullivan, Sr.

[57] ABSTRACT

A method for forming a molded thermoplastic foam structure comprising partially filling a mold with solvent imbibed particles of a thermoplastic resin, pressurizing said mold under conditions such as to prevent vaporization of said blowing agent during subsequent polymer melting, heating said polymer to a flowable state, releasing the mold pressure to permit foaming of the melt and expansion of the foamed polymer within the mold.

1 Claim, 1 Drawing Sheet

THERMOPLASTIC FOAM MOLDING

This is a division of copending application Ser. No. 560,642, filed Dec. 12, 1983, U.S. Pat. No. 4,532,094, 7-30-85.

The present invention relates to a simplified process for molding thermoplastic polymers in foam form.

In the Modern Plastics Encyclopedia, 1982–83, Volume 59, No. 10A, pages 275–278, the disclosure of which is incorporated herein in its entirety by reference, there are disclosed certain processes for preparing what is known as "structural foam". This reference states that structural foam molding processes are similar to conventional injection molding except that a blowing agent is require in the melted thermoplastic resin and the mold is not completely filled during injection. The material adjacent to the surface of the mold forms a non-foamed skin and the blowing agent expands the remaining material to fill the mold and form a cellular core. In all cases described in this reference a thermoplastic material and a chemical blowing agent is melt blended under pressure outside of the mold. Thereafter, if it is a high pressure process, the mold is filled completely with the combination of a decomposed chemical blowing agent held in suspension in the melt by the pressure of the system. The melt in contact with the mold forms a solid skin with no cell development. Thereafter, a portion of the mold cavity is expanded to permit the hot core to foam and fill out the mold. This process produces parts with a smooth surface finish. If it is a low pressure process, the molten resin and blowing agent is injected in a volume less than the volume required to fill the mold cavity. Because the mold is not packed, the pressure developed in the mold cavity, as a result of the injection and heat, rarely exceeds 500 psi. When the pressure is released and the foam expands to fill the mold, the result is a foamed resin part characterized by a swirl pattern of nonuniform color which requires post-finishing for appearance purposes. Important parameters for this process include maintaining the melted material under pressure at all times prior to injection, control of injection velocity and the design of special gates, runners and mold venting.

The art would be advanced by a process which could provide molded foam polymer by a simplified process involving, ease of control and ease of variation from structural foam to substantially uniform low density foam. The art would be further advanced by these techniques as applied to the preparation of fire resistant polymer foam structures.

SUMMARY OF THE INVENTION

The present invention relates to a method for preparing a molded thermoplastic foam structure comprising:

(a) impregnating a thermoplastic polymer in particle form, which polymer is capable of imbibing a blowing agent, with an amount of blowing agent sufficient to foam said polymer to a density of less than about 20 lbs/ft$^3$, to yield at least a substantially free flowable particulate combination;

(b) partially filling a mold with said free flowable particulate combination;

(c) pressurizing said mold to prevent any substantial vaporization of said blowing agent during subsequent polymer melting;

(d) heating said polymer to at least a flowable state;

(e) releasing the mold pressure to permit foaming of the melt and complete filling of the mold with the foamed polymer; and (f) removing the molded foam structure.

By this process foam structures having densities ranging from about 1 to less than 20 lbs/ft$^3$ can be prepared.

DETAILED DESCRIPTION OF THE INVENTION

Figure 1:
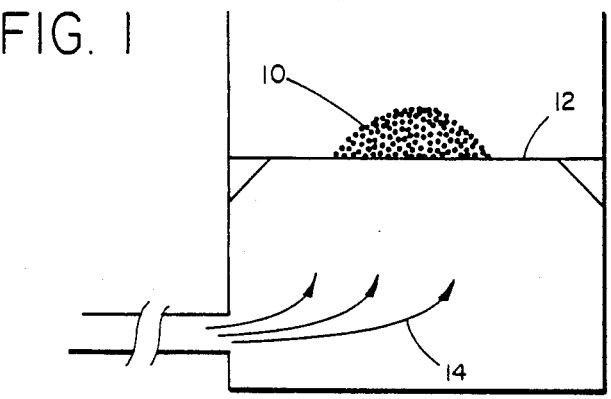
FIG. 1 is a side view of a schematic of a resin impregnation system.

In accordance with the present invention it has been found that wide processing latitude is available when the starting material for the subject molded foam products is a thermoplastic polymer in particulate form which has the requisite amount of blowing agent already imbibed therein. When the starting material is processed into an ostensibly dry particulate free flowing form, the following process sequence can be carried out: (1) this blowing agent-imbibed particulate polymer can be incorporated into a mold of the desired shape, (2) the mold system pressurized to prevent any substantial premature volatization of the blowing agent, (3) the polymer, which already has the blowing agent substantially uniformly dispersed therein, is melted and (4) the pressure released to form an excellent polymer foam structure assuming the shape of the mold.

By this technique the density of the polymer foam can be controlled so that denser structures can be obtained by controlling the concentration of blowing agent in the system in combination with the amount of particulate resin incorporated into the mold and the pressure applied to the closed mold system. By such control, foam structures which range from structural foam having unfoamed skins of controllable thickness of foams of lesser density which have no appreciable unfoamed surface skin can be formed.

Any thermoplastic polymer in particulate form which can be comparatively easily impregnated with a suitable blowing agent to yield the polymer in foam form having a density of less than about 20 lbs. per cubic foot is contemplated. A preferred class of thermplastic polymers are polyetherimides, polycarbonates and polymer blends of polyphenylene oxide and polystyrene. Particularly preferred polyetherimides are those which have the following chemical structure:

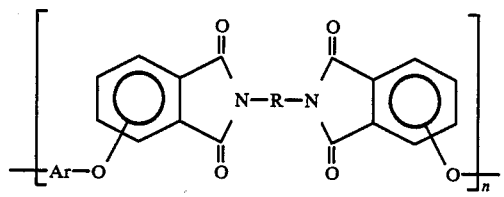

wherein Ar is a divalent organic radical containing from 6–20 carbon atoms, R is a bivalent radical selected from the group consisting of aliphatic, cycloaliphatic, aromatic and araliphatic, and n is an integer having a value greater than 1, for instance, 2, 3, 4 or greater. Particularly preferred are polymers within the scope of the this structure wherein the precursor of Ar is Bisphenol A and R is a phenylene radical selected from the group consisting of the ortho, meta, para isomers or mixtures thereof. Polymers within the scope of this structure can be prepared by procedures outlined in the article by D. M. White et al entitled, "Polyetherimides Via Nitro-Displacement Polymerization . . ." etc, Journal of Polymer Science: Polymer Chemistry Edition, Vol. 19, pages 1635–1658 (1981), copyright 1981, John Wiley and Sons, Incorporated. Particular reference is made to the preparation of polymer "(18 ip)" having a molecular weight (Mw) of 21,000, on page 1653 thereof. The disclosure of this article is incorporated in its entirety herein by reference. Another specific example of the preparation of a polyetherimide within the contemplation of the present invention is as follows:

EXAMPLE 1

A mixture containing 2.855 parts of 1,3-bis(4-phenoxyphthalimido) benzene, 1.180 parts of Bisphenol A, 0.081 part of o-phenylphenol sodium salt and 20 parts of N-methylpyrrolidone is heated to reflux under nitrogen atmosphere. The heating is continued for one hour during which time an approximate total of 10 parts of liquid is distilled off. The reaction mixture is cooled and poured into about 300 parts of methanol which is stirred in a blender. A white polymer is precipitated. The polymer is filtered, washed and dried under vacuum. This polyetherimide in particulate form can be readily imbibed with the preferred blowing agents outlined below.

A commercially available polyetherimide resin which corresponds to the above recited chemical formula, wherein Ar is derived from Bisphenol A and R is a phenylene radical, is Ultem ® 1000 available from General Electric Company, Plastics Operation, One Plastics Avenue, Pittsfield, MA. This material has a $T_g$ of 421° F. It is available in various particle sizes, for example, in a size roughly 1/16–⅛ inch in diameter by 1/16–3/16 inch in length. The following table details certain characteristics of the resin.

TABLE

|  | ASTM TEST | UNITS | ULTEM 1000 |
|---|---|---|---|
| MECHANICAL | | | |
| Tensile strength, yield | D638 | psi | 15,200 |
| Tensile modulus, 1% secant | D638 | psi | 430,000 |
| Tensile elongation, yield | D638 | % | 7–8 |
| Tensile elongation, ultimate | D638 | % | 60 |
| Flexural strength | D790 | psi | 21,000 |
| Flexural modulus, tangent | D790 | psi | 480,000 |
| Compressive strength | D695 | psi | 20,300 |
| Compressive modulus | D695 | psi | 420,000 |
| Gardner impact | — | in-lb | 320 |
| Izod impact | D256 | | |
| notched (⅛") | | ft-lb/in | 1.0 |
| unnotched (⅛") | | ft-lb/in | 25 |
| Shear strength, ultimate | — | psi | 15,000 |
| Rockwell hardness | D785 | — | M109 |
| Taber abrasion (CS 17, 1 kg) | D1044 | mg wt. loss/ 1000 cycles | 10 |
| THERMAL | | | |
| Deflection temperature, unannealed | D648 | | |
| @ 264 psi (¼") | | °F. | 392 |
| @ 66 psi (¼") | | °F. | 410 |
| Vicat softening point, method B | D1525 | °F. | 426 |
| Continuous service temperature index (UL Bulletin 746B) | — | °F. | 338 |
| Coefficient of thermal expansion (0 to 300° F.), mold direction | D696 | in/in-°F. | $3.1 \times 10^{-5}$ |
| Thermal conductivity | C177 | Btu-in/h-ft²-°F. | 1.5 |
| FLAMMABILITY | | | |
| Oxygen index (0.060") | D2863 | % | 47 |
| Vertical burn (UL Bulletin 94) | — | — | V-O @ 0.025" 5 V @ 0.075" |
| NBS smoke, flaming mode (0.060") | E662 | | |
| $D_5$ @ 4 min | | — | 0.7 |
| $D_{MAX}$ @ 20 min | | — | 30 |

The contemplated polycarbonates are those which, in particulate form, are capable of being imbibed with sufficient solvent blowing agent to ultimately yield molded foam parts of a density less than about 20 lbs/ft³. These polycarbonates have the following chemical structure:

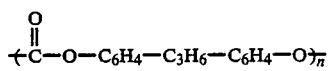

wherein n is a positive integer greater than one so as to yield a solid thermoplastic resin, see, for example, Text Book of Polymer Science, 2nd Edition, Fred W. Billmeyer, Jr., 1971, Wiley-Interscience, N.Y., N.Y., the disclosure of which is incorporated herein by reference. Suitable commercially available polycarbonates are the LEXAN ® polycarbonates from General Electric Company.

The preferred thermoplastic blends of polyphenylene oxide and polystyrene are blends of poly 2,6-dimethyl-1,4-phenylene oxide and high impact polystyrene.

The blend can be in a 20 to 80 weight percent ratio of either component. The term "high impact polystyrene" as used herein is intended to be generic to both the high impact polystyrene and the high impact copolymers derived from the isomeric methyl ethenyl benzenes mixtures and rubbery backbone polymers disclosed in U.S. Pat. No. 4,284,733, the disclosure of which is in its entirety incorporated herein by reference.

In carrying out the present process, it is preferred to employ a resin that is anhydrous so as not to introduce the likelihood of forming deleterious components through the combination of $H_2O$ and the selected solvent or blowing agent. Any such deleterous products could be corrosive to the equipment and possibly degrading to the polymer or its foam structure. Subjecting Ultem ® 1000 particles, for example, to a temperature of approximately 300° F. for a period of about 4 hours will assure at least the substantial absence of $H_2O$ in the resin. Equivalent drying techniques are within the skill of the art.

The invention will be illustrated mainly with reference to the polyetherimides.

In preparing the shaped foam articles of the present invention, the selected resin is first imbibed with the appropriate blowing agent. In the case of the polyetherimides, the polycarbonates and the polyphenylene oxide-polystyrene blends, those which are imbibable with a member selected from the group consisting of methylene chloride, chloroform, 1,1,2-trichloroethane or mixtures thereof are employed. The selected solvent, for example, methylene chloride, should be imbibed or absorbed or otherwise taken up by the polyetherimide particles under the mild conditions of a temperature less than about 100° F., preferably at room temperature and standard pressure, within a period of about less than 48 hours, to an extent which will subsequently permit foaming of the polymer. Full exposure of the surface of the particles during this process enhances the absorption of the solvent. Imbibition of the solvent blowing agent under these mild conditions will yield a composition which is still free flowable powder or particles. This composition can be packaged for transport to a remote site for further processing according to the present process. The particle size of the thermoplastic resin is not critical so long as the subdivided resin is conveniently imbibed with the selected solvent. Obviously if the particles are too large they cannot be easily thoroughly imbibed with the solvent except by the use of extraordinary conditions. Conversely, if the particles are too small, this will increase the danger of premature solvent agglomeration of the particles.

Any convenient system can be employed which will permit the particles to be exposed to the selected solvent. Good control of the imbibing process can be had by uniformly exposing all surfaces of the particles to the solvent in vapor form for whatever time is necessary to yield still free flowable particles which are imbibed with sufficient blowing agent to ultimately yield a thermoplastic foam of the desired density. Particles which are imbibed to the maximum, yet are still free flowable, will produce foamed polymer of extremely low density, for example, as low as less than 1 lb. per cubic foot. On the other hand, particles which have been imbibed with a significantly lesser amount will yield foams which can have a density approaching that of 20 lbs per $ft^3$ or more.

When imbibing the particles, they may be supported on a suitable size mesh screen and the solvent or blowing agent vapors permitted to permeate the layer of particles at approximately room temperature until the degree of imbibition is reached. Alternatively, the particles may be slowly fed into a vessel equipped with one or more agitation means to permit thorough exposure of the particles to the vapor form of the solvent or blowing agent. By these techniques, the pellets or particles can be easily impregnated with from about 5–15 parts, preferably 10 parts, of the selected solvent per 100 parts by weight of the resin particles. The imbibed particles are now in condition to be placed into a mold of the desired shaped.

The imbibed particles are placed in the selected mold so that they occupy only a portion of the volume of the mold. The extent to which the particles occupy the mold volume will depend upon the character of the foam structure desired. Filling the mold to the maximum with the particulate imbibed resin will obviously occupy a significant portion of the mold when the resin is melted, thus not permitting a great deal of expansion thereby yielding a foam structure of comparatively high density. On the other hand, filling the mold to a lesser extent will result in the ultimate formation of a foam structure of correspondingly lower density.

In heating the mold system of the present invention it is to be understood that some of the imbibed blowing agent will vaporize and contribute to the pressurization of the mold. In order to maintain sufficient blowing agent dissolved or dispersed in the molten resin to obtain the desired foam density it is necessary to take into consideration the amount of blowing agent which will be driven from the molten resin to the pressurized atmosphere above it during resin heating and before pressure release. Control of the foam density can be accomplished by adding vaporized blowing agent as part of the partial pressure of the system. One skilled in the art can readily calculate the amount of imbibed blowing agent which would be driven from the heated particles into the space available in any given mold. An equivalent amount or any fraction thereof can be employed during the pressurization. By employing a pressure system ranging from all inert gas to an appropriate mixture of inert gas and blowing agent vapor, foam densities can be varied from a high density to a low density foam.

For instance, using Ultem ® 1000 imbibed with 15 parts by weight of resin particles in a mold of cylindrical shape, 2.5 inches in diameter, 1 inch in length, containing about 30 grams of impregnated resin pressurized with 300 p.s.i. of $CO_2$, will yield a comparatively high density foam of about 20 lbs/$ft^3$. By employing the same resin-blowing agent combination in a weight amount of 25 grams but in a cylindrical mold 2.5 inches in diameter by 6 inches in length, pressurized to 600 p.s.i. at 400° F. with a 40:60 by weight ratio of methylene chloride vapor and $CO_2$ will yield a cylindrical foam shape of a density of about 3 lbs/$ft^3$.

EXAMPLE 2

Figure 2:
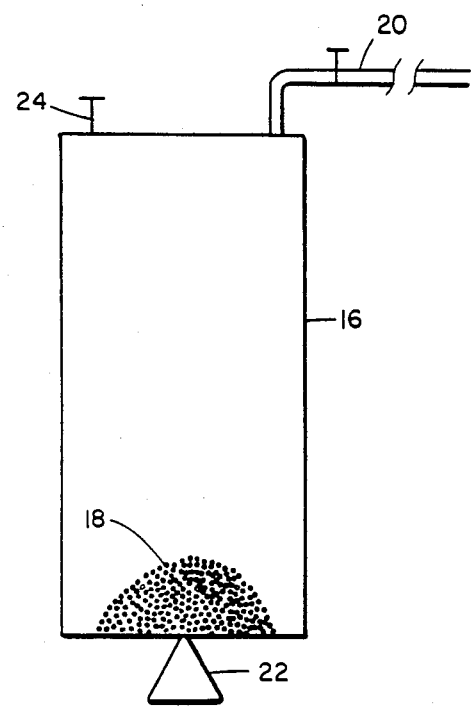
FIG. 2 is a side view of a schematic of a foam mold system.

Polyetherimide resin pellets having a particle size of about 1/16–⅛ inch in diameter and length, available as Ultem ® 1000 from General Electric Company, Plastics Operation, 1 Plastics Avenue, Pittsfield, MA., are impregnated with methylene chloride to an extent of 15 parts per 100 parts by weight of resin. Referring to FIG. 1, this is accomplished by placing a 2 inch layer of the resin pellets 10 on a supporting screen 12 and exposing the pellets to methylene chloride vapors 14 at approximately room temperature. After a period of 48 hours, the particles are imbibed to the extent indicated above. The particles remain freely flowable. Referring to FIG. 2, employing a mold having the internal dimensions of a cylinder 2.5 inches in diameter and 6 inches long, the mold 16 is filled with 30 grams of the imbibed resin 18. The mold is closed and pressurized to 600 psi with a heated mixture of methylene chloride and carbon dioxide in the ratio of 40 to 60 wt.% by way of pressure means 20. The mold is then heated to a temperature of 400° F. by way of heating means 22. After the pellets are completely melted, the pneumatic pressure is rapidly released resulting in foaming inside the mold. The mold is then cooled to solidify the molten polymer and the foamed article removed therefrom. The resulting foam structure has the shape and dimensions of the mold with a fine substantially uniform closed cell structure throughout the article. Its density will be about 4 lbs/ft$^3$. This foam structure has all of the excellent flame resistant and low smoke characteristics of the virgin resin.

What is claimed is:

1. A molded thermoplastic polymer foam structure of solidified molten polymer wherein said polymer is a member selected from the group consisting of a blowing agent solvent imbibable polyetherimide, a linear polycarbonate and a polymer blend of polyphenylene oxide and polystyrene and wherein said polymer in its unfoamed particulate form is capable of imbibing said blowing agent selected from the group consisting of methylene chloride, chloroform, 1,1,2-trichloroethane and mixtures thereof with an amount of blowing agent sufficient to foam said polymer in a mold to a density of less than 18 lbs./ft$^3$.

* * * * *